J. M. SAILER.
TRACTION ENGINE.
APPLICATION FILED NOV. 26, 1910.
1,044,580.
Patented Nov. 19, 1912.
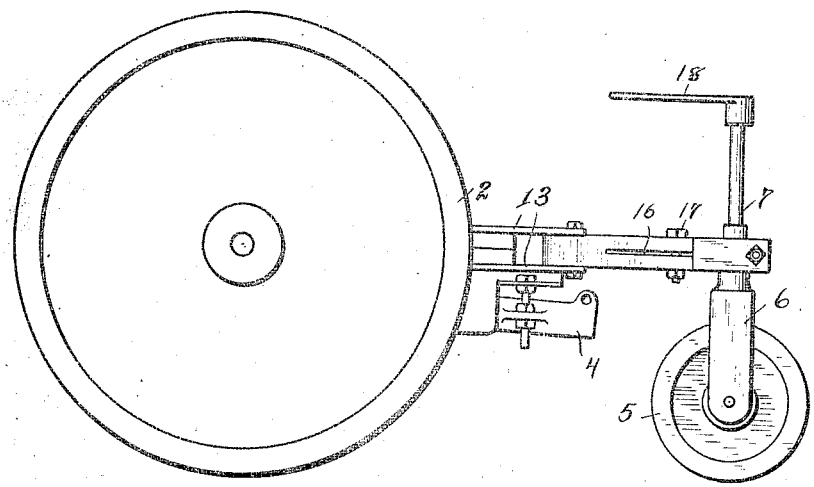
Fig. I.
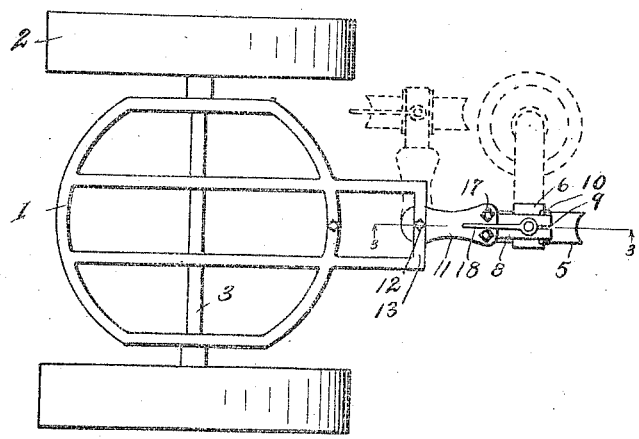
Fig. II.
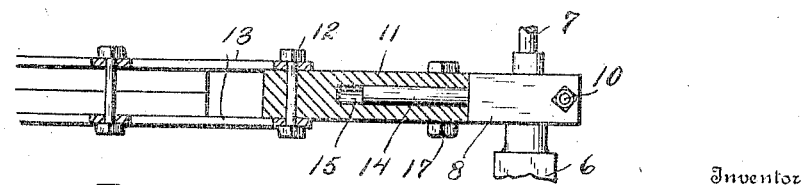
Fig. III.
Witnesses
Luella Greenfield
Phina Woodruff
Inventor
John M. Sailer
By Chappell & Earl
Attorney

UNITED STATES PATENT OFFICE.

JOHN M. SAILER, OF JANESVILLE, WISCONSIN.

TRACTION-ENGINE.

1,044,580.  Specification of Letters Patent.  Patented Nov. 19, 1912.

Original application filed July 15, 1910, Serial No. 572,157. Divided and this application filed November 28, 1910. Serial No. 594,498.

*To all whom it may concern:*

Be it known that I, JOHN M. SAILER, a citizen of the United States, residing at the city of Janesville, county of Rock, State of Wisconsin, have invented certain new and useful Improvements in Traction-Engines, of which the following is a specification.

This invention relates to improvements in traction engines.

My present invention relates particularly to an improved third wheel for traction engines, and is especially designed by me for use in my improved traction engine illustrated and described in my application for Letters Patent filed July 15, 1910, Ser. No. 572,157, of which application this is a division, although it is readily adapted for use in other relations.

The main objects of this invention are to provide an improved third wheel for traction engines, which is so mounted as to permit its being swung to either side out of way of the draw bar or chain, and held in such position, or can be used as a caster wheel, or for steering, or adjusted to an inoperative position when not needed as a support, as is the case where the vehicle or implement to which the engine is hitched forms a part of the support for the engine frame.

Further objects, and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this invention, in which:

Figure I is a side elevation of a structure embodying the features of my invention, the engine proper being omitted and other parts being shown largely in conventional form. Fig. II is a plan view of a structure appearing in Fig. I, the draft device there shown being omitted and the third wheel shown adjusted to one side and into an inoperative position by dotted lines, it being shown in its central operative position by full lines. Fig. III is an enlarged detail vertical section taken on a line corresponding to line 3—3 of Fig. II.

In the drawing, similar reference characters refer to similar parts throughout the several views, and the sectional views are taken looking in the direction of the little arrows at the ends of the section lines.

Referring to the drawing, the frame 1 is shown largely in conventional form, as are also the traction wheels 2 and the axle 3. The traction wheel structure is preferably that shown and claimed in my application for Letters Patent hereinbefore referred to.

The draft or hitch device 4 is that described in my said application, and described in detail and claimed in a divisional application filed concurrently herewith. The third or caster wheel 5 is provided with a yoke-like support or standard 6 having a vertical spindle 7. The bearing 8 for this spindle is slotted at 9, and provided with a clamping bolt 10, so that the spindle may be clamped in the bearing, if desired.

The bearing 8 is supported on the arm 11, which is secured to the frame by the vertical pivot bolt 12. This arm is arranged between the two frame pieces 13 so that by tightening the bolt, the arm is clamped to adjustably secure it.

The bearing 8 is provided with a pivot extension 14, which is arranged in a suitable socket 15 in the arm 11, and the arm is slotted longitudinally at 16 to permit its being clamped upon the pivot by means of the clamping bolts 17. By adjusting this clamping bolt and the bearing, the third wheel is supported in its operative or upright position, or may be supported in an inoperative position,—that is, swung up to the horizontal position, as shown by dotted lines in Fig. II. By adjusting the clamping bolt 12, the arm 11 may be supported in the position indicated by dotted lines in Fig. II, in which position it is out of the way of the draft or hitch device 4 or the centrally connected draft chain or bar.

The spindle 7 is provided with a steering lever 18, so that the third wheel is adapted to serve as a steering wheel, when desired. By thus arranging the parts, the third wheel may be adjusted to permit the engine being attached to a vehicle or implement by means of a draw bar or chain, and the third wheel swung out of operative position when the vehicle or implement serves as a support for the rear portion of the traction frame, as described in my said copending application on the hitch or draft device.

I have illustrated and described my improvements in detail in an embodiment which is simple and desirable. I am aware, however, that my improvements are capable of very great modifications in structural details without departing from my invention, but I do not attempt to illustrate or describe such improvements herein as they will no doubt be understood by those skilled in the art to which this invention relates.

Having thus described my invention, what I claim as new and desire to secure by Letters Patent, is:

1. In a structure of the class described, the combination with the frame, of a pair of traction wheels, a third wheel, a vertical supporting spindle therefor, a bearing for said spindle provided with means for clamping said spindle to prevent its rotation in its said bearing, a supporting arm on which said spindle bearing is adjustably mounted by means of a horizontally disposed pivot, clamping means for said horizontally disposed pivot whereby said supporting arm may be adjusted to support said third wheel in operative or inoperative position, said supporting arm being mounted on said frame by a vertically disposed pivot, and means for securing said arm in its adjusted position on said pivot whereby said wheel is adjustably supported in a central position or at either side of such position.

2. In a structure of the class described, the combination with the frame, of a pair of traction wheels, a third wheel, a vertical supporting spindle therefor, a bearing for said spindle provided with a horizontally disposed pivot, and a means for clamping said horizontally disposed pivot whereby the bearing may be adjusted to support the spindle of said third wheel in a horizontal or inoperative position or in a vertical operative position, and a supporting arm for said spindle bearing pivot mounted on said frame by a vertically disposed pivot and provided with clamping means whereby said third wheel may be supported in operative position in alinement with said supporting pivot for said arm or at the side thereof.

In witness whereof, I have hereunto set my hand and seal in the presence of two witnesses.

JOHN M. SAILER. [L. S.]

Witnesses:
 JOHN CUNNINGHAM,
 CORA M. O'BRIEN.